(12) United States Patent
Hoage

(10) Patent No.: US 7,425,269 B2
(45) Date of Patent: Sep. 16, 2008

(54) METHOD TO INCREASE LATERAL OXYGEN TRANSFER IN WASTE WATER

(76) Inventor: Jerard B. Hoage, 2276 Middle Glasgow Rd., Fairfield, IA (US) 52556-8500

( * ) Notice: Subject to any disclaimer, the term of this patent is extended or adjusted under 35 U.S.C. 154(b) by 0 days.

(21) Appl. No.: 11/873,565

(22) Filed: Oct. 17, 2007

(65) Prior Publication Data

US 2008/0156727 A1    Jul. 3, 2008

Related U.S. Application Data

(62) Division of application No. 11/618,985, filed on Jan. 2, 2007, now Pat. No. 7,306,722.

(51) Int. Cl.
*C02F 3/00* (2006.01)
(52) U.S. Cl. .................................... 210/629
(58) Field of Classification Search .................. 210/629
See application file for complete search history.

(56) References Cited

U.S. PATENT DOCUMENTS

| | | |
|---|---|---|
| 2,966,345 A | 12/1960 | Burgoon et al. |
| 3,646,927 A | 3/1972 | Perl |
| 3,894,355 A | 7/1975 | Carothers |
| 6,102,303 A | 8/2000 | Bright et al. |
| 6,461,500 B1 | 10/2002 | Hoage et al. |
| 6,997,444 B2 | 2/2006 | Weetman et al. |
| 7,306,722 B1 * | 12/2007 | Hoage et al. ............... 210/220 |
| 2002/0014233 A1 | 2/2002 | Gatley et al. |
| 2005/0167858 A1 | 8/2005 | Jones et al. |

* cited by examiner

*Primary Examiner*—Chester T. Barry
(74) *Attorney, Agent, or Firm*—McKee, Voorhees & Sease, P.L.C.

(57) ABSTRACT

An improved apparatus and method which eliminates rotating impellers and air plates. And, as a result, less horse power per unit can be used to achieve smaller entrained air bubbles resulting in increased residence time and enhanced lateral oxygen transfer to replace oxygen consumed by aerobic bacteria during the biodegradation process. It may be used on industrial waste water sources of all types which are biodegradable by aerobic bacteria.

1 Claim, 6 Drawing Sheets

METHOD TO INCREASE LATERAL OXYGEN TRANSFER IN WASTE WATER

CROSS-REFERENCE TO RELATED APPLICATIONS

This is a divisional application of U.S. application Ser. No. 11/618,985 filed Jan. 2, 2007, now U.S. Pat. No. 7,306,722 which application is hereby incorporated by reference in its entirety.

FIELD OF THE INVENTION

This invention relates to improved efficiency and methodology for vacuum aeration units in comparison with those of my earlier U.S. Pat. No. 6,461,500 issued Oct. 8, 2002.

BACKGROUND OF THE INVENTION

This inventor and his former coworkers have a number of patents related to air enrichment of biodegradable waste using aerobic bacteria in waste water. Among those patents are the following: Blough, U.S. Pat. No. 5,194,144, issued Mar. 16, 1993; Blough, U.S. Pat. No. 5,951,867, issued Sep. 14, 1999; Blough, U.S. Pat. No. 6,245,237, issued Jun. 12, 2001; Hoage, U.S. Pat. No. 6,461,500, issued Oct. 8, 2002; and Hoage, U.S. Pat. No. 6,884,353, issued Apr. 26, 2005. The most recent issued of this group is U.S. Pat. No. 6,461,500 and its divisional method case U.S. Pat. No. 6,884,353, both containing an identical disclosure. These two patents relate to the use of the combination of an air plate and a particular shape of impeller to achieve air bubbles of greater than 100 micron size dispersed throughout waste water, kept in place by Brownin movement to enhance lateral oxygen transfer to replace oxygen consumed by aerobic bacteria in the biodegradation process. While this device works, there is an increasing need for continuing improvement, ideally with devices of decreased horsepower and increased ability to result in stable entrained air in order to replenish oxygen consumed by the rapidly growing and multiplying aerobic bacteria as they degrade waste material.

The creation of the ideal device to accomplish substantial decreases in BOD involves an understanding of mechanics/physics of bubbles, as they exist for example in waste lagoons or lakes, ponds, etc. This understanding then allows development of the most efficient mechanical device.

Once air is entrapped in waste water, there is a rapid development stage resulting in a cloud of bubbles. Some bubbles will be several millimeters in diameter, but others will be smaller. Each bubble is buoyant and will tend to rise towards the surface. As bubbles become smaller, small particles and dissolved organic compounds very often collect on the surface of the bubble while it is submerged. Gas will be exchanged slowly across the surface of the bubbles resulting in a continual evolution of the size and composition of each bubble. In general, in these devices air is really entrapped by an enclosure of a large air volume in a contained zone but is usually drawn into the interior (entrained) where there is intense and convergent flow of water. The device of the present invention results in very small or microbubbles, that is, less than 100 microns in size. In affect, what can be called "minibubble clouds" are created around the device resulting in enhanced air gas exchange. As aerobic bacteria multiply using the 8-10 parts per million of oxygen that are dissolved in water at standard temperature and pressure, oxygen in the entrained air dissolves in the water to replenish that portion consumed by the aerobic bacteria which multiple exponentially creating an ever increasing demand for more oxygen. The device of the present invention improves upon U.S. Pat. No. 6,461,500 and serves the need for meeting the increased oxygen demand necessary for the aerobic bacteria to do their work to decrease the parts per million of BOD in waste water.

Accordingly, it is a primary objective of the present invention to improve upon the device of my prior art existing inventions to provide an aeration unit which consumes less horsepower, and which has the highest degree of lateral oxygen transferred in order to replace oxygen used by aerobic bacteria during the digestion process. The process enhances the production of small microbubbles less than 100 microns in size throughout the waste water.

The method and means for accomplishing the above primary objective and advantage as well as others will become apparent from the detailed description of the invention which follows hereinafter.

BRIEF SUMMARY OF THE INVENTION

An improved apparatus and method which eliminates rotating impellers and air plates from aerators substituting a specially designed disc. And, as a result, less horse power per unit can be used to achieve smaller entrained air bubbles resulting in increased residence time for entrained air and enhanced lateral oxygen transfer to replace oxygen consumed by aerobic bacteria during the biodegradation process. It may be used on industrial waste water of all types and from all sources that are biodegradable by aerobic bacteria.

DETAILED DESCRIPTION OF THE PREFERRED EMBODIMENT

Figure 1:
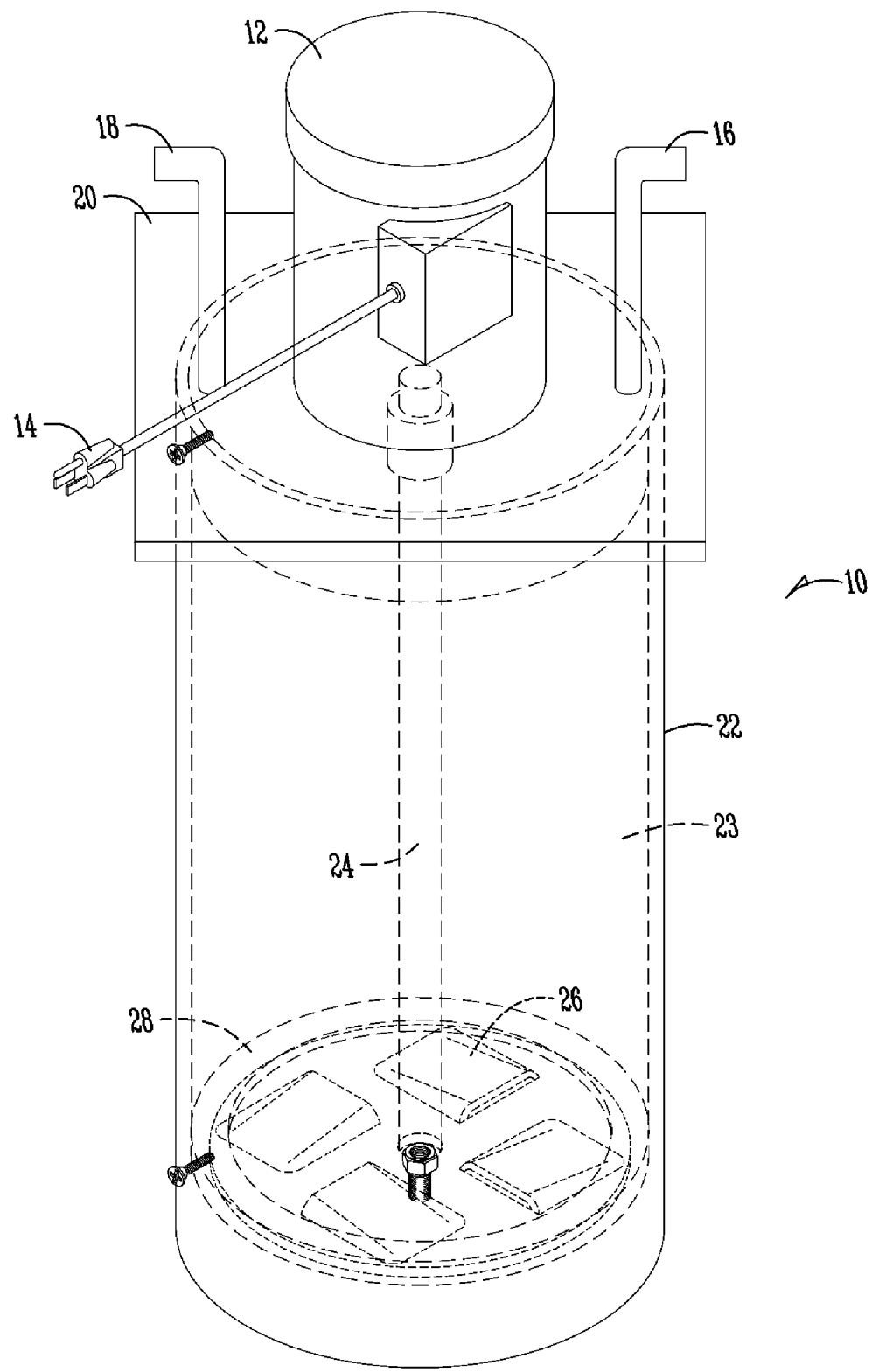
FIG. 1 is a perspective view of the aeration device of the present invention.
Figure 2:
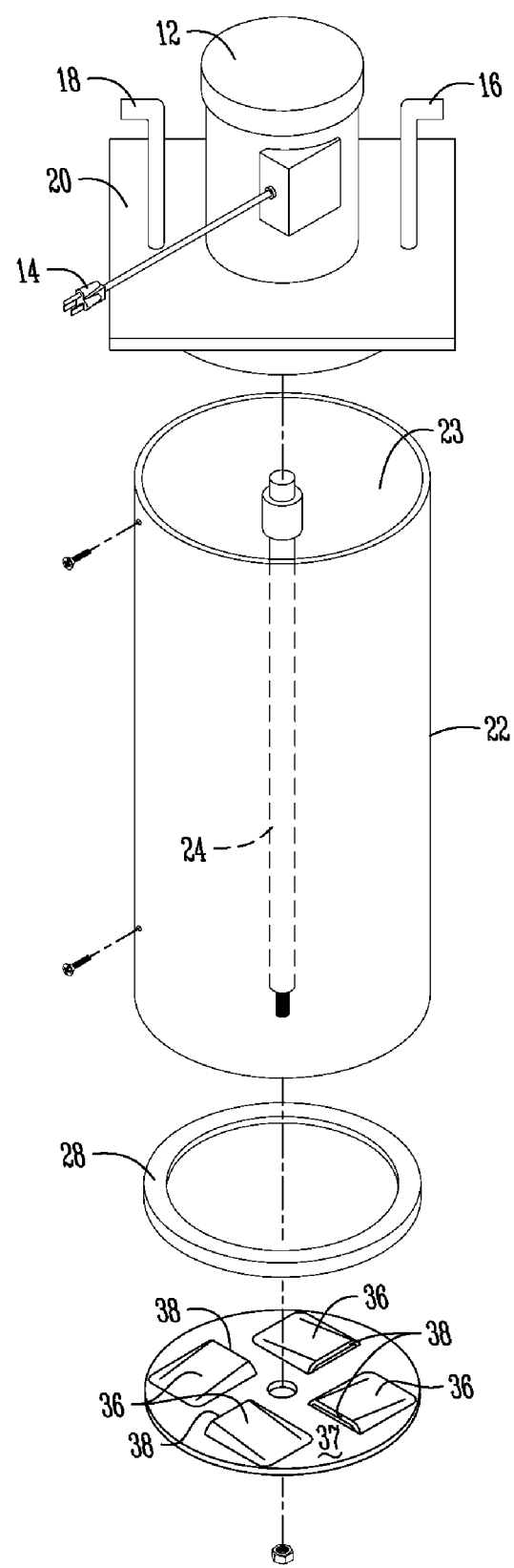
FIG. 2 is an exploded view of the aeration device of FIG. 1.
Figure 3:
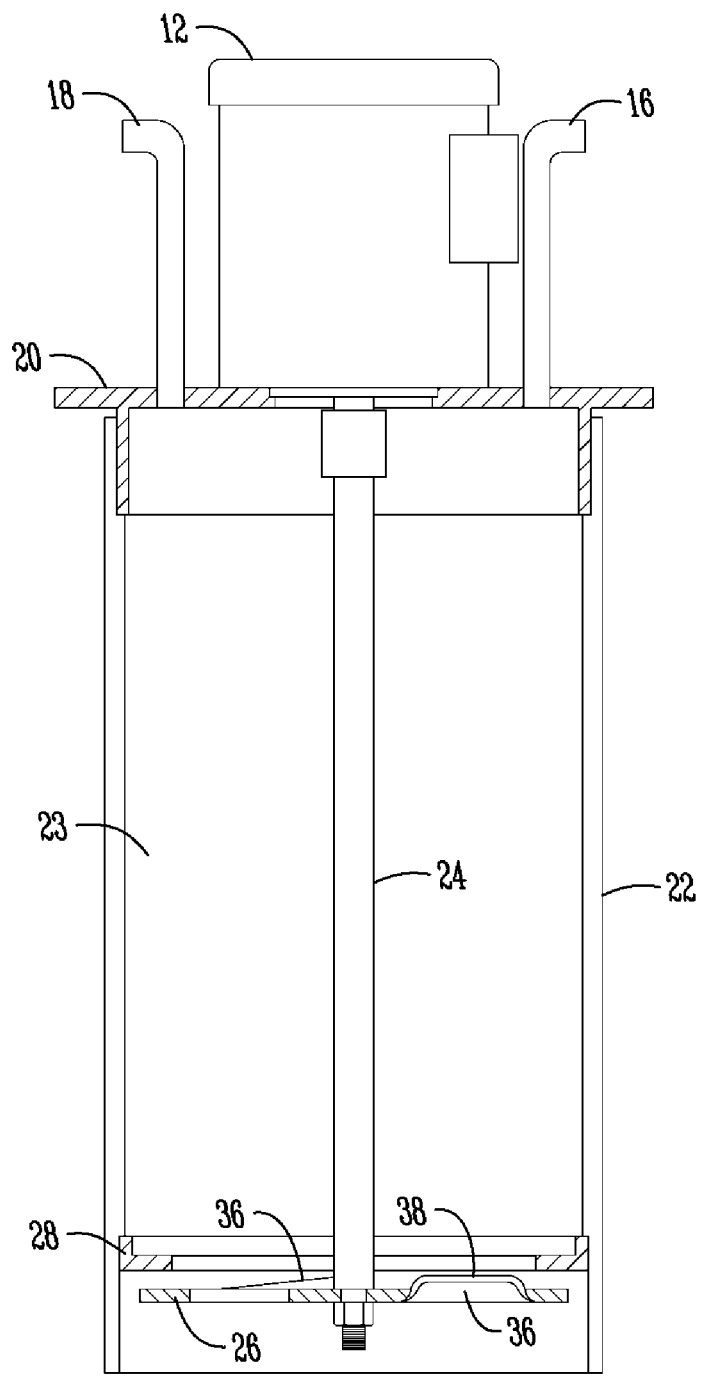
FIG. 3 is a front view of the aeration device of FIG. 1.

The unit is best illustrated in overall perspective in FIG. 1. It is a device which may, for example, be fitted in a conventional septic tank or placed in a lagoon or pond. The aeration device 10 is operated by motor 12, energized via electrical hookup 14. As seen in FIG. 2, the unit 10 has air intake lines, 16 and 18, which draw ambient air. Motor 12 is mounted to motor mount plate 20 which is attached to one end of circular housing wall 22 which defines a chamber 23. Mounted inside of circular housing wall 22, and attached to motor 12 is drive shaft 24. Mounted to circular housing 22, opposite motor 12 is louvered disc 26. Above disc 26 and spaced apart therefrom, is interior stop ring 28. Interior stop ring 28 is held adjacent to the wall 22 by an o-ring or it can be friction fit as illustrated in FIG. 3. Air intake tubes 32 and 34 are shown, adjacent the side wall of housing 22.

Figure 6:
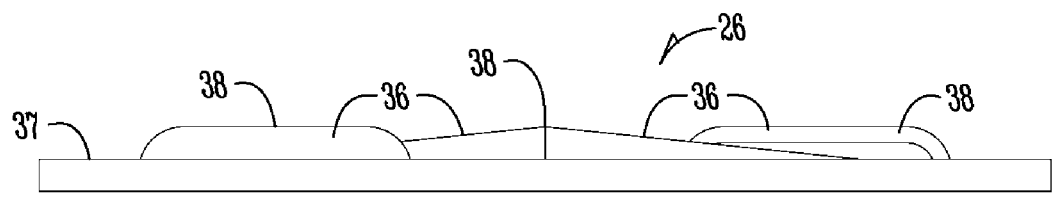
FIG. 6 shows a side view of the construction of the aeration louvered disc.

The configuration of louvered disc 26 is best illustrated in FIG. 6 which depicts a side view of the aeration louvered disc.

Figure 5:
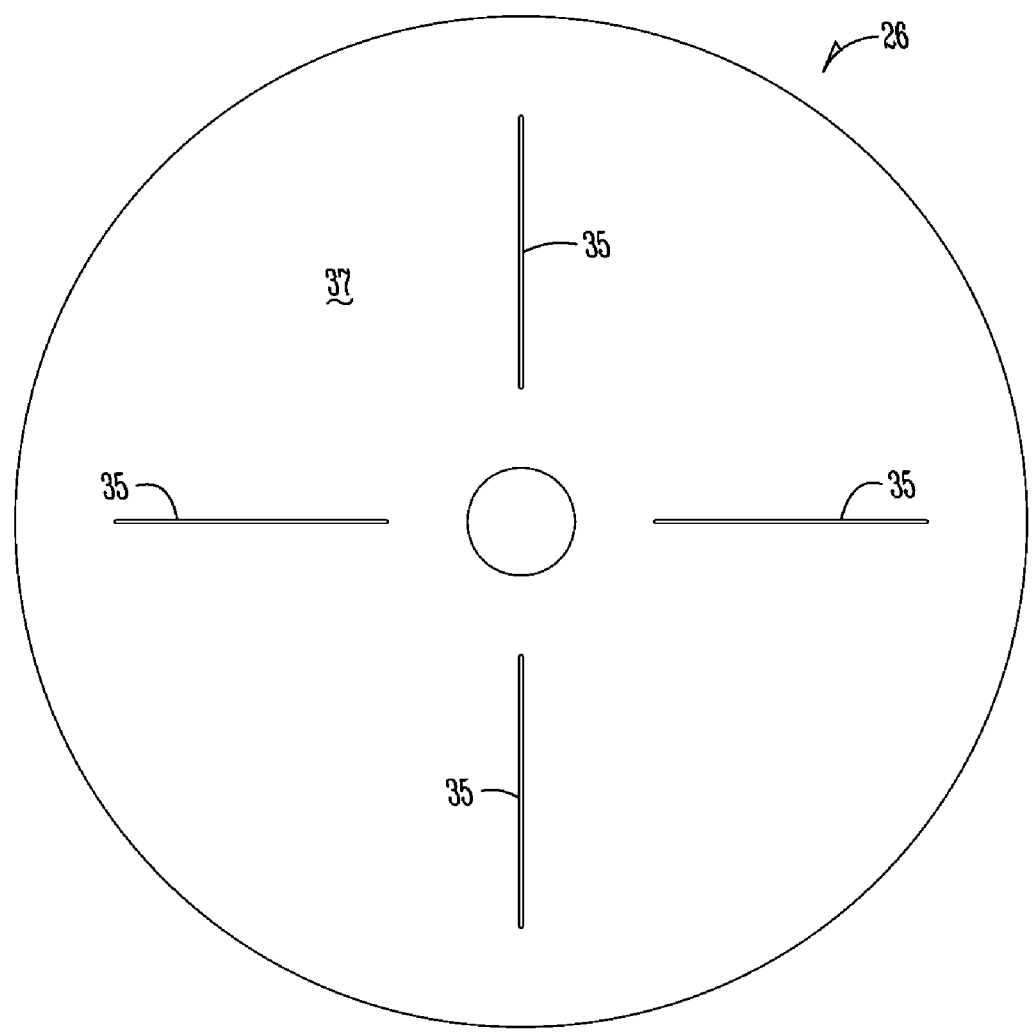
FIG. 5 is a plan view of the disc blank for making the aeration louvered disc.

As seen in FIG. 5, disc 26 has a series of slits 35 positioned at 90° intervals from each other. The disc blank of FIG. 5 is then press stamped to make the louvered disc of FIG. 6.

Once stamped, the slits 35 become the louvers 36. As best seen in FIG. 6, the louvers 36 gently slope upwardly from the surface 37 of disc 26 with the angle generally varying within the range of a 3° slope to no more than a 5° slope with 3° being preferred since it takes less energy to move the 3° slope disc through waste water. It has been found that slopes of from 3° to 5° represent the proper balance for sufficiently generating less than 100 micron diameter bubbles and maximizing the efficiency of low energy consumption. Generally, the more the slope increases the more energy is consumed as drag increases.

Figure 4:
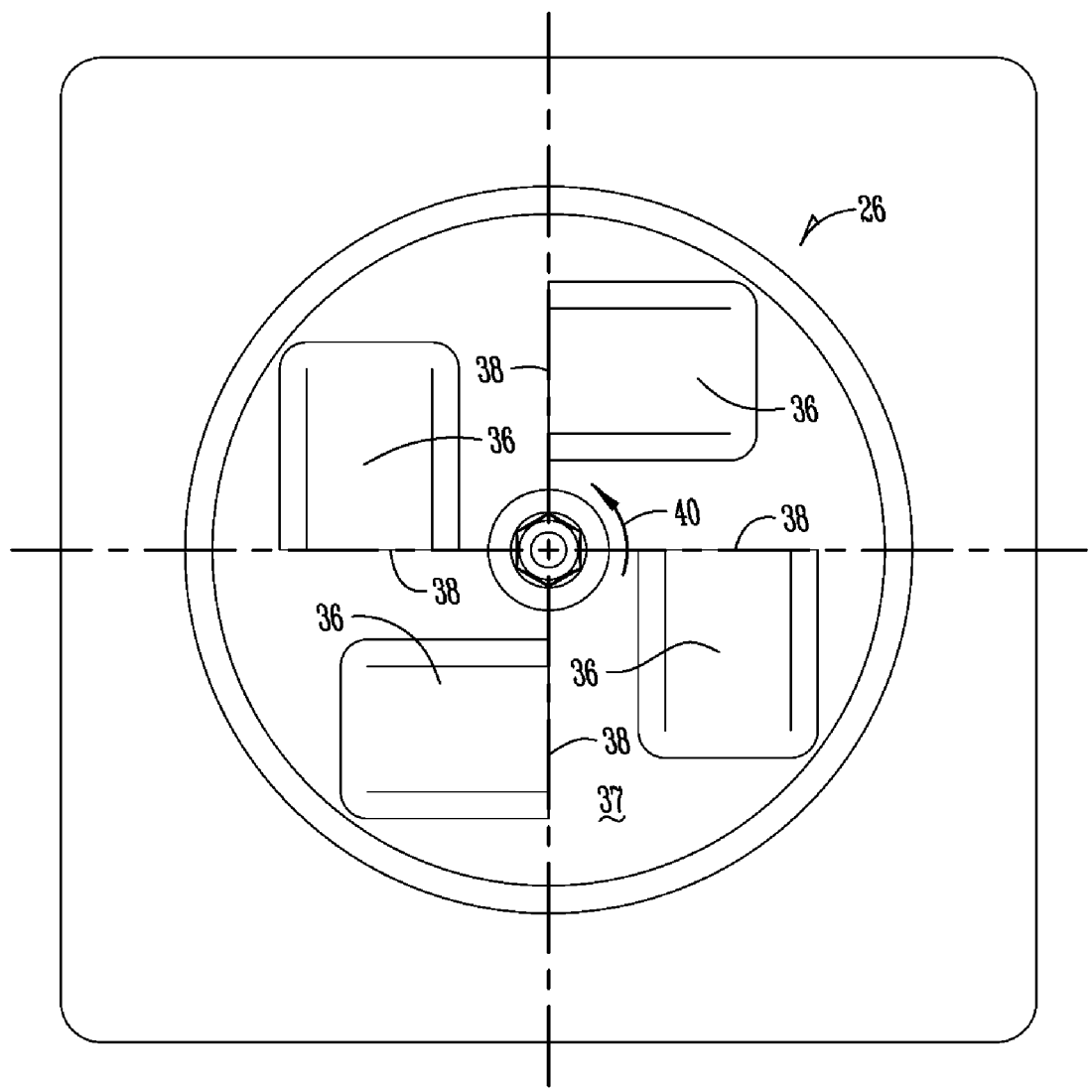
FIG. 4 is a bottom view of the aeration device of the present invention.

The disc 26 is configured of, for example, four distinct louvers 36. Each has slope and top front edge 38. Looking at the disc as illustrated in FIG. 6, it does not dwell in a single horizontal plane but rather in moving from forward edge 38 it slopes down to the horizontal plane of surface 37. The louver rotates as indicated by directional arrow 40 in FIG. 4 (looking up from the bottom). As it rotates in the direction indicated by arrow 40, air is pulled through the slits 35 in the manner illustrated in FIG. 7. In particular, air is pushed through slits 35 since the atmospheric pressure is greater than the partial vacuum created, and also through air tubes 32 and 34 through disc 26 as it rotates in the manner shown by directional arrow 40. Disc 26 as it rotates constant creates constant disruption by larger volumes of air pushed through slots 35 which disrupt the air bubbles tending to make them even smaller. The smaller bubbles then transfer down into the water adjacent and around the area of the disc. The chamber defined by housing wall 22 quickly is evacuated of water. Because the bubbles are so small (sized generally then 100 microns) and they move like colloidal particles via Brownian movement throughout the wastewater tank to enhance lateral oxygen transfer. In this way, the invention results are achieved as illustrated above and below.

Entrained air after operation of the device 10, can be calculated or measured. One useful piece of equipment that can be used to measure entrained air is a test meter normally used in the concrete industry that is in ASTM and AASHTO compliant. A suitable meter to be used is a Humboldt pressure meter, known as H-2783.

The saturation level of oxygen in waste water is 8 to 11 ppm, STP. Entrained air made by the device 10 of the present invention provides reserve air which moves into as saturated oxygen once the bacteria depletes the level of saturated oxygen in the waste water.

Generally, certain constructional features are worthy of mention. The diameter of the louvered disc 26 can vary from two inches up to 12 inches, depending upon the size of the waste water body. A two inch diameter unit can use a standard 1/8 horsepower motor whereas the 12 inch disc will usually use about 1½ horsepower motor.

Figure 7:
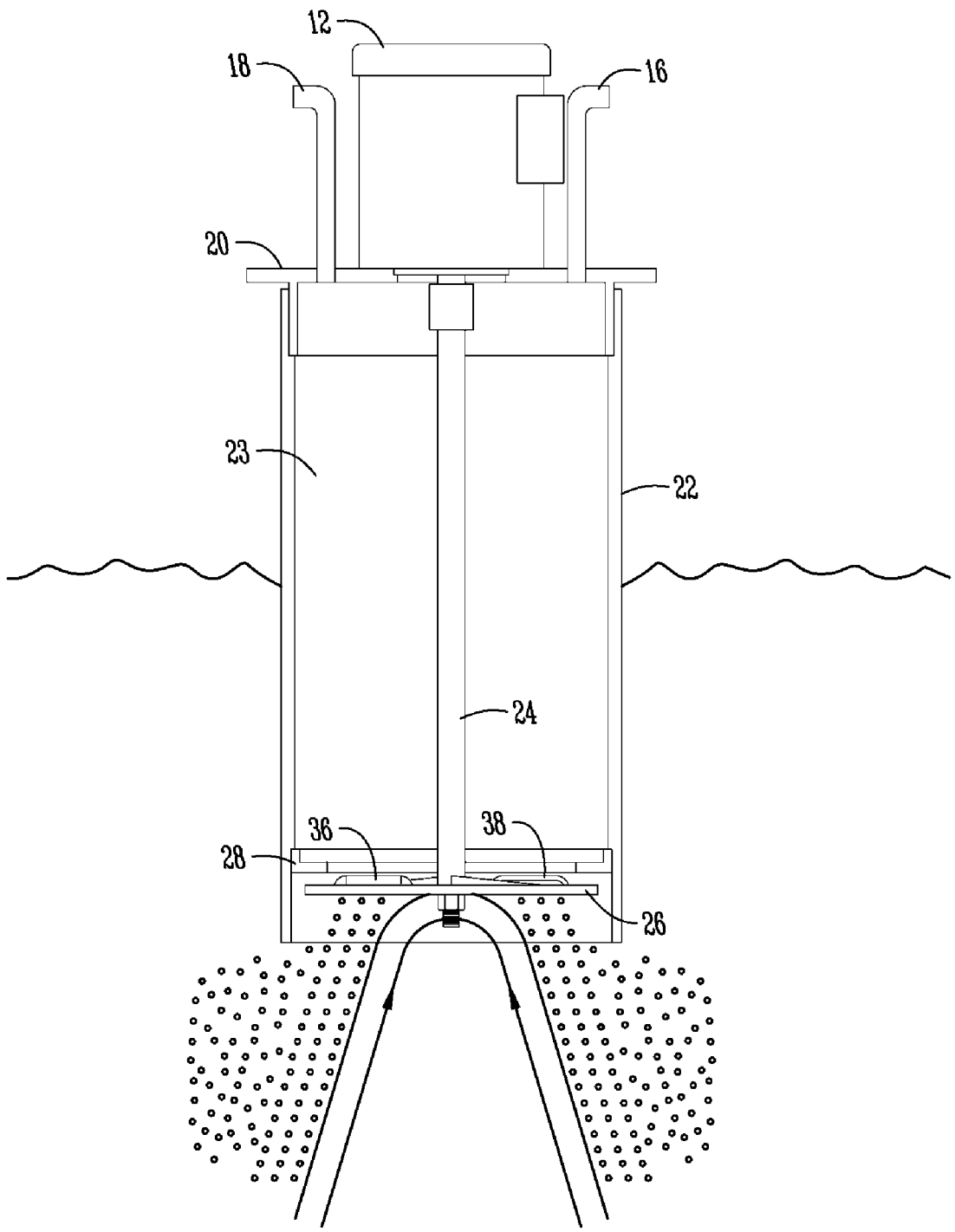
FIG. 7 shows schematically the small microbubbles while the aerator operates, and shows the affect of the water stop ring on the surrounding area adjacent the aeration louvered disc.

Water stop ring 28 controls the diameter of the outlet and assures that the agitated and air entrained waste water will be forced down and into the overall pool of waste water, all as illustrated in FIG. 7.

Certain other features may be optionally employed. For example, within the chamber defined by housing or wall 22 positioned above disc 26 and above stop ring 28, one may employ a zeolite filter in order to affect the 20% oxygen 80% nitrogen ratio of air to enrich the air to, for example, 50% oxygen and 50% nitrogen.

In comparison tests with my most recent patent, a new unit can evacuate the air chamber of inside of wall 22 in 1.5 seconds compared to 4 seconds for the old unit. Average load is 0.3 amps versus 0.6 amps. The average bubble size in the old unit is 250 microns and in the present unit less than 100 microns. And stability testing shows that the entrained air will stay in the waste water for times varying from two to six hours depending upon the precise waste water source used. Direct comparisons with the old unit, for liquid manure tested comparably for an equivalent number of hours showed BOD at 11,000 ppm in the old unit versus 640 ppm in the new unit. Moreover, the testing reveals that even metal contaminants were decreased over time, perhaps because they were oxidized to soluble components. Although the latter point is theory.

It can be seen in comparison with the old unit that less energy is used, the louvered disc 26 is easier to control, takes less horsepower, provides entrained air level bubble size that is smaller, evacuates the chamber faster, runs quieter and in general provides significant improvement in operation and resulting test data efficiency, all with less mechanical parts. It therefore can be seen that the invention accomplishes at least its primary objective.

It goes without saying that certain modifications to the mechanical features of the invention may be made and yet still come within the spirit and scope of the invention which is defined solely by the following claims.

What is claimed is:

1. A method of aeration of industrial waste water to enhance biodegradation, comprising:

moving atmospheric air downwardly through a confined elongated zone through use of a rotating louvered disc within said zone, said downward movement being into a larger zone of reduced air pressure and being through said louvered disc;

whereby the downwardly moving air in said elongated zone interfaces the waste water in the area around the louvered disc, forcing water within the openings of the louvered disc to create agitation causing entrained air within bubbles smaller than 100 microns in diameter to disperse throughout the waste water, said bubbles being capable of staying entrained within the waste water for a time of from about 2 to about 6 hours; and maintaining the dispersed bubbles in said waste water to increase lateral oxygen transfer to replace dissolved oxygen used by aerobic bacteria present in the waste water.

* * * * *